| United States Patent [19] | [11] Patent Number: 4,725,498 |
|---|---|
| Hauber | [45] Date of Patent: Feb. 16, 1988 |

[54] PAPER-ADHESIVE TAPE TO RESTORE, PRESERVE AND ASSEMBLE PAPER SUBSTRATES

[75] Inventor: Rüdiger Hauber, Bückeburg, Fed. Rep. of Germany

[73] Assignee: Hans Neschen GmbH & Co. K.G., Buckeburg, Fed. Rep. of Germany

[21] Appl. No.: 726,021

[22] Filed: Apr. 23, 1985

[30] Foreign Application Priority Data

Apr. 28, 1984 [EP] European Pat. Off. ...... 84 73 0045.6

[51] Int. Cl.$^4$ ............................................. C09J 7/02
[52] U.S. Cl. ................................ 428/355; 428/537.7; 524/427; 524/294
[58] Field of Search ............... 428/343, 355, 352, 356, 428/537.7; 524/427, 294

[56] References Cited

U.S. PATENT DOCUMENTS

| 2,778,744 | 1/1957 | Holt | 524/294 |
|---|---|---|---|
| 3,175,989 | 3/1965 | Cannon et al. | 524/294 |
| 3,441,430 | 4/1969 | Peterson | 428/355 |
| 3,725,122 | 4/1973 | Limburgenhot et al. | 428/356 |
| 3,865,770 | 2/1975 | Blake | 428/355 |
| 3,893,960 | 7/1975 | Sheppard | 524/294 |
| 4,033,918 | 7/1977 | Hauber | 428/449 |
| 4,038,454 | 7/1977 | Lehmann et al. | 428/356 |
| 4,195,107 | 3/1980 | Timm | 524/294 |
| 4,341,680 | 7/1982 | Hauber et al. | 525/293 |
| 4,424,298 | 1/1984 | Penzel et al. | 524/747 |

*Primary Examiner*—Edith Buffalow
*Attorney, Agent, or Firm*—Zarley, McKee, Thomte, Voorhees & Sease

[57] ABSTRACT

Pressure sensitive paper adhesive tape which is especially designed for use in libraries and archives to restore, preserve and assemble paper substrates such as books, documents, charts, drawings, engravings and the like. It contains a transparent to opaque base paper weighing 10–50 g/m$^2$ which is coated on one side with a self-adhesive (self-sticking) material, and the coated side of the tape may be covered with a silicon-treated separating paper. The self-adhesive material composition consists essentially of:

- 60–85 parts by weight of copolymerisates consisting essentially of from 50–90 wt. % acrylates whose alcohol component has 2 to 12 C atoms, and 10–50 wt. % styrene;
- 5–20 parts by weight of alkali metal and/or alkaline earth metal salts of polyacrylic acids;
- 3–15 parts by weight of primary softeners based on alkylbenzyl phthalates;
- 5–15 parts by weight of alkylphenol polyglycol ethers; and
- 1–4 parts by weight of calcium carbonate;

wherein the total of all parts by weight amounts to 100. The styrene portion in the copolymerisate 2.5 wt. % can be replaced by acrylonitrile and/or 2–8 wt. % by acrylic acid. The base paper is preferably an alumfree, weakly alkalized cellulose paper which is buffered with calcium carbonate to a pH value of 7.5–8.5.

This adhesive tape offers the substantial advantage that, besides having good adhesive properties, it displays unusual ageing stability, while at the same time its self-adhesive material, after long-term storage in joined condition, can again be dispersed in water to detach, if necessary, the adhesive tape from the paper substrate without damaging the latter.

6 Claims, No Drawings

PAPER-ADHESIVE TAPE TO RESTORE, PRESERVE AND ASSEMBLE PAPER SUBSTRATES

FIELD OF THE INVENTION

The invention refers to a pressure-sensitive paper adhesive tape to restore, preserve and assemble paper substrates, containing a base paper, ranging from transparent to opaque, weighing 10–50 g/m$^2$ which is coated on one side with a self-adhesive (self-sticking) material, and the coated side of the tape may be covered with a silicon-treated separating paper.

BACKGROUND OF THE INVENTION

Self-adhesive tapes are used to a great extent in libraries and archives where often books, documents, charts, drawings, engravings and other paper records are stored which are damaged and which need to be repaired or preserved. For example, torn pages which are unavoidable in frequently used books can be repaired with adhesive tapes in almost invisible fashion. Likewise, thanks to these tapes, pages can be inserted in perfectly flat condition, torn-out pages reattached in a book, single pages joined into layers for sewing, damaged edges of documents repaired or book spines stripreinforced inside. However, these adhesive tapes are also frequently used in other areas, e.g. by art dealers and picture framers to secure prints, drawings, paintings, and aquarelles or photos to the passe-partout and for back-lining and sealing the backs of pictures after their insertion, so that the framed picture will be protected against the infiltration of dust particles and insects.

To achieve all these purposes it is important for the base of the adhesive tapes to consist of paper, as foils are unsuitable as bases in this respect. Nonageing grades of paper which through uniform felting of relatively long fibers display a high tensile strength and toughness are preferred. It has been found advantageous in practice to provide for base paper of the tape in at least two different thicknesses, namely a very thin transparent paper weighing 10–30 g/m$^2$ by means of which almost invisible adhesions can be obtained, and a somewhat heavier, opaque paper weighing about 30–50 g/m$^2$, which can be used for those adhesions which must withstand higher loads.

Besides the base paper, the self-adhesive material of the tape also must meet special requirements. It should display good instant adhesive power on paper, good cohesion (internal strength) and as much as possible high ageing stability. Furthermore, it has lately also become desirable that the self-adhesive material on the one hand remains insensitive to the usual atmospheric moisture and temperature fluctuations in nonair conditioned rooms, while showing constant adhesive properties, and on the other hand can be dispersed in water even after long-term adhesion, without damaging the joined substrates by tearing out their fibers. The self-adhesive materials of the hitherto known paper-adhesive tapes, to be sure, possess the required adhesive properties and have on the whole sufficient ageing stability, but they cannot be dispersed in water so that, once a tape is affixed, it can no longer be detached from the substrate.

Dispersible or water-soluble self-adhesive materials are well known in themselves; they are generally used for water-detachable self-adhesive labels and double-faced adhesive paper tapes. By way of example, DE-PS Nos. 2,214,293 and 2,236,575 describe dispersible self-adhesive materials for labels, containing acrylate copolymerisates, alkali salts of polyacrylic acids and polyvinyl methyl ethers. Dispersible and water-soluble self-adhesive materials for double-faced adhesive tapes to make endless paper webs are described in several patent specifications. These self-adhesive materials consist of: a mixture of polyvinyl pyrrolidone with crosslinking agents and polyols or polyalkylglycol ethers as softeners (U.S. Pat. No. 3,096,202); of epoxidized rubber-like polymers with water-soluble secondary monoamines (U.S. Pat. No. 3,661,874); of a conversion product (partial ester) of a methyl vinyl ether-maleic acid anhydride copolymerisate an alkylphenol polyglycol ether and nonconverted alkylphenol polyglycol as softeners (DE-PS No. 2,311,746); of a mixture of arylic acid-alkoxyalkyl acrylate copolymerisates and polyethylene glycol derivates, as well as polyethylene glycols and polypropylene glycols as softeners (U.S. Pat. No. 3,441,430); of arylic acid acrylate coplymerisates neutralized with alkanolamines, sortening polyoxyethylene compounds and acid colophonium resins neutralized with alkanolamines (DE-OS No. 2,360,441); of acrylic acid acrylate copolymerisates partially neutralized with soda lye (NaOH) and tertiary ethoxylated N-alkyl alkane diamine (DE-PS No. 2,904,233); or of acrylate vinyl carboxylic acid copolymerisates with ethoxylated (alkyl) phenols and ethoxylated alkylmono- and alkyldiamines, in which the acid in the copolymerisate is preponderantly neutralized with potassium hydroxide (EP-PS No. 58,382).

Among these well-known self-adhesive materials in variable compositions there is no version which meets the requirements of a high-grade paper-adhesive tape. To be sure, all these self-adhesive materials are dispersible or water-soluble, but they have no adequate ageing stability. Moreover, the water-soluble types are mostly so highly water-soluble that in high atmospheric humidity the adhesion spot will become loose, whereas the dispersible types become so thoroughly attached to the paper substrates that in the event of their redispersion they will cause partial damage to the substrates by tearing out the fibers.

Accordingly, there is a need in the art for a self-adhesive composition, and paper tape coated therewith, which has the required adhesive properties, has excellent ageing stability, and water dispersibility permitting removal without destroying the archival quality of the subject repaired by the tape.

THE INVENTION

Objects

It is among the objects of the invention to provide a paper-adhesive tape having the required adhesive properties while at the same time satisfying high demands with regard to ageing stability, as well as dispersibility.

It is another object of the invention to provide an improved pressure-sensitive, self-sticking adhesive that is particularly suitable for archival quality paper tape repair purposes.

It is another object of the invention to provide a pressure-sensitive adhesive composition, the adhesive strength of which is easily regulatable by varying the amount of one or two components of a two or three component copolymerisate.

It is another object of the invention to provide a pressure-sensitive adhesive composition which has vastly improved ageing characteristics making it particularly suitable for museum or archival purposes, which adhesive resists normal humidity conditions, and does not permanently set upon ageing, yet is selectively releasable upon application of water which permits dispersion release of the adhesive without damaging the item to which it is adhered.

It is another object of the invention to provide an improved buffered adhesive which does not yellow, become greasy, or permanently set upon ageing, and is particularly resistant to discoloration due to acid migration from papers which the adhesive contacts.

Still other objects will be evident from the Summary and Detailed Description which follows.

SUMMARY

These objects are achieved according to the invention in that the self-adhesive material composition consists essentially of:

- 60–85 parts by weitht of copolymerisates consisting essentially of from 50–90 wt. % acrylates whose alcohol component has 2 to 12 C atoms, preferably 4 to 8 C atoms, and 10–50 wt. % styrene;
- 5–20 parts by weight of water-soluble alkali metal and/or water-soluble alkaline earth metal salts of polyacrylic acids having alkyl chains of $C_1-C_{12}$ lengths;
- 3–15 parts by weight of primary softeners based on alkylbenzyl phthalates in which the alkyl is $C_1-C_{10}$, preferably $C_4-C_8$;
- 5–15 parts by weight of $C_1-C_{12}$ alkylphenol polyglykol ethers in which the ethylene oxide units may be 1–20; and
- 1–4 parts by weight of calcium carbonate, in which the total of all parts by weight amounts to 100.

The invention is based on the surprising discovery that copolymerisate dispersions containing acrylates and styrene which are provided with the aforementioned supplementary admixtures, produce self-adhesive materials in the combination of properties required for paper-adhesive tapes. The paper-adhesive tapes manufactured with these self-adhesive materials possess a good instant adhesive power on paper and a good cohesion (inner strength). Moreover, they display an unusually high ageing stability and can on the other hand, even after long-term adhesion be dispersed in water without any problem. The invention has therewith and for the first time made a paper-adhesive tape available which meets all the practical requirements.

The adhesive base of the paper-adhesive tape of the invention is the copolymerisate from acrylates whose alcohol component (which may be primary, secondary or tertiary but preferably is primary, and which may be linear or branched) contains 2–12 C atoms (preferably 4–8 C atoms) with a 10–50 wt. % share of styrene. It was found that the adhesive base has an unusually high ageing stability. Ageing stability is generally evaluated according to a known test, the so-called "temperature storage test". In this test a substrate joined to the adhesive tape (e.g. a standard paper) is stored for several days (normally 3 days) at 105° C., and ageing stability is considered present when the self-adhesive materials after such storage does not change its color to yellow or brown or make the paper greasy. The adhesive tape of the invention passes this test even after a temperature storage time of 6 days, which corresponds to the level when particularly high demands are made on ageing stability.

Adhesive bases containing acrylate polymerisates and copolymerisates without styrene do not show this advantageous behavior; on the contrary, they become slightly yellowish during temperature storage, and after long-term storage at room temperature, they adhere so strongly to the paper substrates that they can practically no longer be dispersed without damaging the paper fibers. Also unsuited are copolymerisate dispersions containing vinyl acetate besides the acrylates, since with an increasing vinyl acetate content, these copolymerisates as well will change to yellow or brown during temperature storage (6 days/105° C.).

By using well-known processes, acrylate styrene copolymerisate dispersions suited for the purposes of the invention can be made into initiators by radical polymerization of the monomers in water, while using appropriate emulsifiers and ammonium or potassium peroxodisulfate. Corresponding polymerization processes which may be employed are described, e.g., in DE-OS Nos. 3,040,086, 3,118,593 and 3,119,967.

Normally, acrylate styrene copolymerisate dispersions will form (on paper or foils, after drying) relatively moisture-insensitive films with a low water-absorption capacity (4–12% water absorption after 24 hours of water storage according to DIN 53,495). However, it was also found that these films can readily be redispersed in water after adding to the self-adhesive material water-soluble alkali metal and water-soluble alkaline earth metal salts of linear polyacrylic acids (molecular weight: 3,000–20,000) having alkyl chains of $C_1-C_{12}$ lengths which may be linear or branched, as well as primary softeners containing alkylbenzyl phthalate in which the alkyl is $C_1-C_{10}$, linear or branched, preferably $C_4-C_8$, such as e.g. butyl benzyl phthalate or octyl benzyl phthalate. The usual standard softeners dibutyl phthalate and diisooctyl phthalate on the other hand should not be used, since they turn yellow during temperature storage (6 days/105° C.), and clearly exhibit lower solvation capacities than alkylbenzyl phthalate (measurement according to the clarification temperature method).

The alkylphenol polyglycol ethers (also designated as ethoxylated alkylphenol ethers), preferably those with up to 12 C atoms in the alkyl residue (which may be linear or branched) and with a HLB value of 10–15, which are furthermore added to the self-adhesive materials, function as emulsifiers. "HLB" means Hydrophilic-Lyophilic Balance, and its value depends, amongst others, on the number of ethylene oxide units in the molecule. These ethers improve the water-absorption capacity and therewith the redispersibility of the copolymerisate. At the same time, they also act as softeners and increase to a limited extent the adhesive power and instant adhesion (adhesive power upon contact). The ageing stability of the copolymerisate suffers no ill effect from this addition.

Finally, the finely divided calcium carbonate uniformly dispersed into the self-adhesive material serves as buffer to neutralize those acids which might originate during natural ageing through chemical decomposition reactions or migrate into the adhesive due to acidiferous adhesions to items which are acidic) and which may result in discolorations.

The adhesive strength of the self-adhesive material decreases with an increasing styrene content in the copolymerisate, so that the adhesive strength can also be adjusted by regulating the styrene content. If necessary, the adhesive strength can also be adjusted by polymerizing acrylonitrile and/or acrylic acid into the copolymerisate, since the nitrile and carboxyl groups will improve the adhesive properties. The acrylyonitrile and/or acrylic acid content, however, should not be too high as described below, as otherwise the self-adhesive material will turn yellow during temperature storage (6 days/105° C.). The invention thus provides that of the styrene portion in the copolymerisate, 2–5 wt. % can be replaced by acrylonitrile and/or 2–8 wt. % by acrylic acid. This means that a composition containing e.g. 20 wt. % styrene in which e.g. 3 wt. % of the styrene is replaced by acrylic acid, will then show a styrene portion of 17 wt. % and an additional content of 3 wt. % acrylic acid.

To manufacture the adhesive tape of the invention, an acrylic acid styrene copolymerisate dispersion, containing the above-described additions, is made weakly alkaline by means of ammonia water, spread on the base paper and dried, the coating in dried condition generally being within the range of 15–14 g/m². As base paper for the tape, the types of paper referred to at the outset may be considered, provided they meet the further requirements that they will not become deformed when moistened or by the effect of wetness.

It is preferred that the base paper itself also should be suitably adjusted to a pH value of 7.5–9.0 by means of calcium carbonate (amount of admixture 0.3–5.0 wt. %), so as to buffer it against the possible occurence of acids and provide it with better ageing stability. Acids can originate in paper as a result of poor storage conditions, decomposition of the cellulose, disintegration of the oils in printing inks, acid concentration from the surrounding atmosphere in the storeroom, etc. A paper buffered in this manner should be alum-free, since the (alkaline) calcium carbonate in the pulp converts with the (acid) aluminum sulfate to aluminum hydroxide, carbon dioxide and calcium sulfate, i.e. to substances which no longer exert any buffering action against the acids which are either present or being formed.

DETAILED DESCRIPTION OF THE PREFERRED EMBODIMENTS OF THE INVENTION

The invention is further illustrated by the following examples. The indication "wt. %" refers to the solids without water:

EXAMPLE 1

Adhesive composition:
70 wt. % acrylate dispersion (copolymerisate of 45% 2-ethyl hexyl acrylate, 40% butyl acrylate, 15% styrene)
12 wt. % potassium salt of polyacrylic acid (molecular weight 5,000–10,000)
8 wt. % octyl benzyl phthalate
7 wt. % ethoxylated p-nonylphenol ether with a HLB value of 12
3 wt. % calcium carbonate The components of the composition were mixed into an approx. 50% aqueous suspensions in a container with a stirrer and made weakly alkaline by means of ammonia water (pH value: 8.5–9.0). The thus-obtained dispersion of self-adhesive material was applied to a transparent special tissue paper (weight: about 20 g/m²) of 25 μm thickness, weakly alkaline (pH value: 7.5–8.5) and buffered with calcium carbonate, as well as to a corresponding opaque long-fibered paper of 80 μm thickness (weight: 40–45 g/m²), by means of a conventional coating calendar, in such a manner that after drying in a hot air current (100°–150° C.), and adhesive film was obtained in a thickness of 20 to 40 g/m². The paper coated with self-adhesive material was additionally covered on the adhesive side with a silicone-treated separating paper (weight: about 67 g/m²) and wound into rolls.

EXAMPLE 2

Adhesive composition:
75 wt. % acrylate dispersions (copolymerisate of 17% butyl acrylate and 30% styrene)
10 wt. % sodium salt of polyacrylic acid (molecular weight 4,000–12,000)
5 wt. % butyl benzyl phthalate
9 wt. % ethoxylated p-nonylphenol ether with a HLB value of 13.5
1 wt. % calcium carbonate The manufacturing and processing were performed according to Example 1.

EXAMPLE 3

Adhesive Composition:
70 wt. % acrylate dispersion (copolymerisate from 90% 2-ethyl hexyl acrylate, 4% styrene, 2% acrylonitrile, 4% acrylic acid)
12 wt. % sodium salt of polyacrylic acid (molecular weight 4,000–10,000)
6 wt. % butyl benzyl phthalate
10 wt. % ethoxylated p-nonylphenol ether with a HLB value of 13
2 wt. % calcium carbonate The manufacturing and processing were performed according to Example 1.

EXAMPLE 4

Adhesive Composition:
74 wt. % acrylate dispersion (copolymerisate from 75% butyl acrylate and 25% styrene)
10 wt. % sodium salt of polyacrylic acid (molecular weight 4,000–10,000)
5 wt. % butyl benzyl phthalate
10 wt. % ethoxylated p-nonylphenol ether with a HLB value of 13.5
1 wt. % calcium carbonate The manufacturing and processing were performed according to Example 1.

The adhesive tapes obtained according to Examples 1–4, after being coated and dried, had an adhesive film in the pH range of 8.5–9.0. After quick ageing (through a 13-day storage at 105° C.) the pH value had fallen to 7.5–8.0. In all cases the adhesive film displayed good adhesive strength and shearing strength. It adhered immediately to paper substrates (adhesive power upon contact, i.e. pressure sensitive), and even after a 3-month storage (normal air-conditioned storage) in joined condition it was again dispersible in water. After temperature storage (6 days/105° C.), it showed no discoloration or greasing.

It should be understood that various modifications within the scope of this invention can be made by one of ordinary skill in the art without departing from the spirit thereof. I therefore wish my intention to be defined by the scope of the appended claims as broadly as the prior art will permit, and in view of this specification if need be.

What is claimed is:

1. An improved paper adhesive tape suitable for archival purposes comprising: the adhesive composition coated on a base paper consisting essentially of a substantially alum-free, weakly alkalized cellulose paper buffered with calcium carbonate to a pH value of 7.5 to 8.5.

2. An imrpoved paper adhesive tape suitable for archival purposes comprising: the adhesive composition as in claim 4 coated on a base paper consisting essentially of a substantially alum-free, weakly alkalized cellulose paper buffered with calcium carbonate to a pH value of 7.5 to 8.5.

3. An improved paper adhesive tape suitable for archival purposes comprising: the adhesive composition as in claim 7 coated on a base paper consisting essentially of a substantially alum-free, weakly alkalized cellulose paper buffered with calcium carbonate to a pH value of 7.5 to 8.5.

4. An improved paper adhesive tape as in claim 1 which includes a silicon-treated separating paper covering the adhesive coating.

5. An improved paper adhesive tape as in claim 2 which includes a silicon-treated separating paper covering the adhesive coating.

6. An improved paper adhesive tape as in claim 3 which includes a silicon-treated separating paper covering the adhesive coating.

* * * * *